US010622932B2

(12) United States Patent
Holthaus

(10) Patent No.: US 10,622,932 B2
(45) Date of Patent: Apr. 14, 2020

(54) METHOD FOR EMULATING A THREE-PHASE BRUSHLESS DC MOTOR USING A LOAD EMULATOR

(71) Applicant: dSPACE digital signal processing and control engineering GmbH, Paderborn (DE)

(72) Inventor: Nils Holthaus, Schlangen (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 544 days.

(21) Appl. No.: 15/336,838

(22) Filed: Oct. 28, 2016

(65) Prior Publication Data

US 2017/0047880 A1 Feb. 16, 2017

Related U.S. Application Data

(63) Continuation of application No. PCT/EP2015/059073, filed on Apr. 27, 2015.

(30) Foreign Application Priority Data

Apr. 28, 2014 (EP) .................................... 14166171

(51) Int. Cl.
H02P 27/08 (2006.01)
G05B 17/02 (2006.01)
H02P 7/06 (2006.01)

(52) U.S. Cl.
CPC ............ *H02P 27/08* (2013.01); *G05B 17/02* (2013.01); *H02P 7/06* (2013.01)

(58) Field of Classification Search
CPC ............ H02P 27/08; H02P 7/06; G05B 17/02
(Continued)

(56) References Cited

U.S. PATENT DOCUMENTS 8,768,675 B2 7/2014 Bracker et al.
9,857,820 B2 1/2018 Bracker et al.
(Continued)

FOREIGN PATENT DOCUMENTS

DE 10 2005 048 464 A1 4/2007
JP 2008118797 A 5/2008
(Continued)

OTHER PUBLICATIONS dSpace_2010 (Electronic Load Emulator, dSPACE Magazine Jan. 2010 Jan. 2010 pp. 56-57).*

(Continued)

*Primary Examiner* — Brian S Cook
(74) *Attorney, Agent, or Firm* — Muncy, Geissler, Olds & Lowe, P.C.

(57) ABSTRACT

A method for emulating a three-phase, brushless DC motor using a load emulator that is connected in a three-phase manner via load terminals to supply terminals of a motor control unit. The load emulator has emulator power electronics and an emulator control unit for controlling the emulator power electronics. The emulator control unit determines the supply terminals that are actuated by the motor control unit and the supply terminals that are not actuated, and the emulator power electronics are actuated by the emulator control unit in such a way that phase currents calculated by the emulator control unit on the basis of a motor model flow in the supply terminals that are actuated by the motor control unit and a phase voltage calculated by the emulator control unit on the basis of a motor model is applied to the supply terminal that is not actuated by the motor control unit.

20 Claims, 8 Drawing Sheets

(58) Field of Classification Search
USPC .......................................................... 703/13
See application file for complete search history.

(56) References Cited

U.S. PATENT DOCUMENTS

2009/0033259 A1   2/2009   Cesario et al.
2010/0039120 A1   2/2010   Plude et al.

FOREIGN PATENT DOCUMENTS

JP   2009510994 A   3/2009
JP   2011101548 A   5/2011

OTHER PUBLICATIONS

Torres_2008 (Sensorless BLDC Control with Back-EMF Filtering Using a Majority Function, Microchip Technology Inc. AN1160 2008).*
Mao_1997 (Zero-Voltage-Transition DC-Link Techniques for Three-Phase AC-DC-AC PWM Converters, IEEE 1997).*
ML4425_2001 (ML4425 Sensorless BLDC Motor Controller, Fairchild Semiconductor, Rev. 1.0.2 Jul. 2, 2001 Jul. 2, 2001).*
Lee_2008 (A novel starting method of the surface permanent-magnet BLDC motors without position sensor for reciprocating compressor, IEEE Transactions on industry applications, vol. 44, No. 1, Jan./Feb. 2008).*
P-to-A_Converter (Phase to Amplitude Converter downloaded from http://www.dk8pp.de/electronics/dds/p_to_a.html Jun. 19, 2019, dated Oct. 30, 2008).*
dSpace_2010 (Electronic Load Emulator, dSPACE Magazine Jan. 2010 Jan. 2010 pp. 56-57) (Year: 2010).*
Torres_2008 (Sensorless BLDC Control with Back-EMF Filtering Using a Majority Function, Microchip Technology Inc. AN1160 2008). (Year: 2008).*
Mao_1997 (Zero-Voltage-Transition DC-Link Techniques for Three-Phase AC-DC-AC PWM Converters, IEEE 1997). (Year: 1997).*
ML4425_2001 (ML4425 Sensorless BLDC Motor Controller, Fairchild Semiconductor, Rev. 1.0.2 Jul. 2, 2001 Jul. 2, 2001). (Year: 2001).*
Lee_2008 (A novel starting method of the surface permanent-magnet BLDC motors without position sensor for reciprocating compressor, IEEE Transactions on industry applications, vol. 44, No. 1, Jan./Feb. 2008). (Year: 2008).*
P-to-A_Converter (Phase to Amplitude Converter downloaded from http://www.dk8pp.de/electronics/dds/p_to_a.html Jun. 19, 2019, dated Oct. 30, 2008). (Year: 2008).*
Japanese Office Action dated Feb. 7, 2019 in corresponding application 2016-565141.

* cited by examiner

METHOD FOR EMULATING A THREE-PHASE BRUSHLESS DC MOTOR USING A LOAD EMULATOR

This nonprovisional application is a continuation of International Application No. PCT/EP2015/059073, which was filed on Apr. 27, 2015, and which claims priority to European Patent Application No. 14166171.0, which was filed in Europe on Apr. 28, 2014, and which are both herein incorporated by reference.

BACKGROUND OF THE INVENTION

Field of the Invention

The invention relates to a method for emulating a three-phase brushless DC motor using a load emulator, wherein the load emulator is connected in a three-phase manner via its load terminals to the supply terminals of a motor controller, and the load emulator has emulator power electronics and an emulator controller for controlling the emulator power electronics, wherein the emulator controller determines the supply terminals that are driven by the motor controller and the supply terminals that are not driven, and the emulator power electronics are driven by the emulator controller in such a manner that phase currents $i_{emulate}$ calculated by the emulator controller on the basis of a motor model flow in the supply terminals that are driven by the motor controller, and a phase voltage $v_{emulate}$ calculated by the emulator controller on the basis of a motor model is applied to the supply terminal that is not driven by the motor controller. Moreover, the invention also relates to the emulator controller of a load emulator that is configured such that it can carry out the above-described method for emulating a three-phase brushless DC motor in conjunction with emulator power electronics.

Description of the Background Art

Methods for emulating electrical loads with the aid of load emulators are used for testing motor controllers under laboratory conditions without the need to connect a physical electric drive—here in the form of a three-phase brushless DC motor—to the controllers. The electrical load, which is to say the three-phase brushless DC motor, is instead emulated by the load emulator. The motor controller typically has a control unit with a power output stage in the form of a converter. The control unit generates converter control data that are used to appropriately drive the power switches of the converter, which typically are implemented by semiconductor switching elements (IGBT, IGCT, etc.). In the application case under consideration here, the converter of the motor controller operates as an inverter, which is to say it has a DC voltage source as the energy source and drives a load with AC voltage.

The load emulator is oftentimes implemented in the form of a hardware-in-the-loop simulator, which is to say by a simulation computer that calculates mathematical models of the environment to be simulated—here, the load in the form of the brushless DC motor—using numerical methods and that for its part has a power electronic output stage—the emulator power electronics—that can be connected through the load terminals of the load emulator to the corresponding supply terminals of the motor controller. The method for emulating a three-phase brushless DC motor implemented on the load emulator ultimately ensures that the motor controller is electrically loaded through its supply terminals as if it were connected to the real drive.

Brushless DC motors operate like permanently excited three-phase synchronous machines and have low wear and low maintenance on account of their brushless construction. In the industrial realm, such as in the automotive industry for example, brushless DC motors are often used as drives for auxiliary equipment such as, e.g., pump drives (oil, fuel) and actuating drives (variable-speed transmissions, clutches, headlight range adjusters, valves/flaps).

In brushless DC motors driven in block commutation mode, two of the three motor phases are always driven by the motor controller—two of the three supply terminals of the motor controllers are then driven—and the third phase of the three-phase winding is not driven by the motor controller; the corresponding supply terminal of the motor controller is then likewise not driven. A rotating magnetic field is created through periodic switching of the three-phase windings by the motor controller. In the phase of the brushless DC motor that is not driven by the motor controller, the phase current drops, and soon vanishes completely. The phase of the brushless DC motor that is not driven is often referred to as the currentless phase, wherein—as explained above—the states of not being driven and of being currentless can be separated in time. If a phase of the brushless DC motor is no longer driven by the motor controller, the consequence is that the phase current in the phase that is no longer driven ultimately vanishes, but not necessarily immediately after commutation, and the phase is then in fact currentless.

In the phase of the brushless DC motor that is not driven, however, a back EMF is induced, the sensing of which is of major importance for driving the brushless DC motor, since the angular position of the rotor can be determined therefrom, and hence the motor controller can determine the time of the next commutation, which is to say the switch from non-driven to driven supply terminals and vice versa, even without a separate rotary position sensor. For this reason, the emulation of the back EMF induced in the non-driven phase is essential in emulating brushless DC motors that are driven in block commutation mode so that the motor controller can determine the time of the next commutation even without a rotary position sensor. However, calculation of the back EMF as part of emulation is important even in the case of brushless DC motors equipped with a rotary position sensor, since only in this way can the physical relationships of the emulated motor, and thus the connected loads, be correctly calculated and emulated.

In order to apply appropriate connected electrical loads to the supply terminals of the motor controller, the emulator power electronics include voltage sources and current sources, which can generally be connected to the load terminals of the emulator power electronics through decoupling inductances. Thus, by suitably connecting the voltage sources and current sources to the load terminals of the emulator power electronics it is possible to react to whether a load terminal only has an induced back EMF connected to it in the state in which it is not driven by the motor controller, or whether a load terminal carries a current in the state in which it is driven by the motor controller. The decoupling inductances provided between the load terminals and the voltage and current sources prevent the connected electrical loads defined by the switched voltage and current sources from exerting an undelayed effect on the load terminals.

SUMMARY OF THE INVENTION

Because a high-quality emulation of a three-phase brushless DC motor using a load emulator is only possible if the time of commutation is detected reliably even under changing operating conditions, it is therefore an object of the invention to provide a method for emulating a three-phase brushless DC motor using a load emulator such that a reliable detection of commutation is guaranteed.

The object derived above is attained in an exemplary embodiment in that in a first step that the transition of a supply terminal j of the motor controller from the non-driven state $S_{PH}(j)=1$ to the driven state $S_{PH}(j)=0$ is detected when the magnitude of the difference voltage $v_{diff}(j)$ between the output voltage $v_{inv}(j)$ measured at the supply terminal j of the motor controller and the calculated phase voltage $v_{emulate}(j)$ is greater than a predetermined voltage threshold $v_{TH}$ for a predetermined first time period $t_1$.

The described detection of the transition of a supply terminal of the motor controller from the non-driven state to the driven state is based on the consideration that at this transition, the affected supply terminal is no longer in a sense "disconnected" from the DC voltage source of the motor controller by open semiconductor switches, but instead is connected by semiconductor switches that are once again closed to the voltage source of the motor controller, and consequently the output voltage measured at the relevant supply terminal of the motor controller is once again actively influenced and thus changed. The resulting divergence of the measured voltage at the supply terminal and the phase voltage calculated by the motor model, which of course is still being implemented under the assumption of the old, non-driven state, is a reliable indicator for a change in the switching state of the motor controller, and is used accordingly. Focusing on the supply terminal of the motor controller that initially is not driven is useful because this supply terminal must necessarily transition to the driven state at the next commutation event, thus is of necessity subject to a state change.

In another step of the method according to the invention, provision is made that after detection of the state transition of the supply terminal j of the motor controller from the non-driven state $S_{PH}(j)=1$ to the driven state $S_{PH}(j)=0$, the emulator controller drives the emulator power electronics such that the phase current $i_{emulate}$ calculated by the emulator controller flows through the supply terminal j that is now driven by the motor controller. In practice, the motor model incorporated in the emulator controller experiences a structural shift with regard to the phase of the motor connected to the supply terminal j when a commutation process is detected, so that a calculation is adjusted accordingly. The emulator controller then switches a current source onto the load terminal in question, in particular in the emulator power electronics, so that the calculated phase current can be set in the corresponding phase. Because the calculated phase current is intended to cover the positive and negative sign regions, the current source of the emulator power electronics also functions as a current sink. Therefore, when a current source is mentioned hereinbelow, it also always includes the functionality of a current sink.

An appropriate choice of the predetermined voltage threshold $v_{TH}$ is essential for reliable detection of the transition of a supply terminal from the non-driven state to the driven state. In an embodiment, provision is made that the voltage threshold $v_{TH}$ is sized such that it is larger than the maximum deviation between the calculated phase voltage $v_{emulate}$ in the phase of the non-driven supply terminal j and the actual voltage $v_{inv}(j)$ measured in return at the non-driven supply terminal j that is to be expected during a constant switching state of the motor controller and thus of the emulator power electronics. The aforementioned deviations are primarily to be expected on account of overshooting resulting from capacitive effects at jumps in the nominal voltage. As a general rule they depend on the voltage swing that must be emulated for the non-driven or currentless phase. The deviation is thus a function of the DC link voltage of the motor controller. For this reason, provision is made in particular that the voltage threshold $v_{TH}$ is chosen as a fraction of the DC link voltage $v_{DC\_Link}$ of the motor controller, for example, is chosen to be smaller than one half of the DC link voltage $v_{DC\_Link}$, or for example, is chosen to be one fifth of the DC link voltage $v_{DC\_Link}$ of the motor controller.

With regard to the choice of the predetermined first time period $t_1$, provision is made in an exemplary embodiment that the predetermined first time period $t_1$ is chosen to be longer than transient voltage distortions that are to be expected and/or that the predetermined first time period $t_1$ is chosen to be longer than the latency of the imposition of voltage by the emulator controller and the emulator power electronics, preferably the predetermined first time period $t_1$ should be chosen to be longer than the longest of the two aforementioned time periods. The transient voltage distortions that are to be expected can be caused by incident electromagnetic radiation that in turn is a function of environment and structure and accordingly must be determined on site. For emulating three-phase brushless DC motors that are used in auxiliary equipment in the automotive field, experience shows that the time period $t_1$ is in the single-digit microsecond range.

While the fate of the non-driven and thus ultimately currentless phase at the next commutation process is certain, the phase or the supply terminal of the motor controller switches from the non-driven state to the driven state, the fate of a previously driven supply terminal is uncertain because the supply terminal may remain driven at the next commutation process, but it may also switch to the non-driven state. It is thus necessary to discover which supply terminal of the motor controller that was previously in the driven state switches to the non-driven state and which one remains in the driven state.

According to an embodiment of the invention, provision is made that the transition of a supply terminal k of the motor controller from the driven state $S_{PH}(k)=0$ to the non-driven state $S_{PH}(k)=1$ is detected based on current when the calculated phase current $i_{emulate}$ through the load terminal k of the load emulator, and hence through the corresponding supply terminal k, is sensed as zero. This criterion is based on the fact that the current flows in a phase supplied with voltage through a supply terminal of the motor controller that is initially driven, but this phase current ultimately vanishes in the state of the supply terminal that is no longer driven.

In an embodiment of the method according to the invention, it has proven especially advantageous that the above-described current-based detection of the state change by the motor controller of a supply terminal k from the driven state $S_{PH}(k)=0$ to the non-driven state $S_{PH}(k)=1$ is used if the magnitudes of the calculated phase currents $i_{emulate}$ of the driven supply terminals k, l are above a current threshold $i_{TH}$ at the point in time when the state transition of the supply terminal j of the motor controller from the non-driven state $S_{PH}(j)=1$ to the driven state $S_{PH}(j)=0$ is detected. This measure prevents the inadvertent identification of a small phase current flowing through a driven supply terminal as zero current. Errors of this nature in detecting the state change from the driven state to the non-driven state can be avoided by the use of the criterion of the current threshold $i_{TH}$. Thus, current-based commutation detection can mainly be applied reliably when large phase currents are present with a large load, whereas the risk of misinterpretation exists when a very small load and only extremely small phase currents are present.

An embodiment of the method provides that a useful choice of the current threshold depends on the rise time of the simulated current in the motor windings, and thus on their simulated inductance. In order to prevent the current ripples that arise as a result of the three-phase pulse-width modulated (PWM) voltages typical of block commutation, and that are also simulated, from distorting the detection of the remaining commutation phases, the aforementioned current threshold $i_{TH}$ is defined around the—calculated—zero current. This current threshold should be set such that the current ripples are not permitted to have any zero crossings at a PWM duty cycle of 50%—this is the case with minimal current in the region of the zero current—between the two phases that are driven and thus supplied with current up until commutation. In other words, at the time when commutation is detected, a simulated minimum current must still flow through the corresponding inductances of the two phases that are driven and thus supplied with current so that the current ripples do not cause a current zero crossing to be detected. Because the voltage swing acts in series on the inductances of the two phases that are driven and thus supplied with current up until commutation, and consequently the current also flows through these inductances in series, twice the phase inductance $L_{PH}$ assumed in the model must be used as a basis for the specification of the threshold value. The following thus results as a reasonable and preferred choice for the current threshold $i_{TH}$, where T is the PWM voltage period of the motor controller:

$$i_{TH} = \frac{u_{DC\_Link}}{2\,L_{PH}} \frac{T}{2}.$$

According to an embodiment of the method according to the invention, the transition of a supply terminal k of the motor controller from the driven state $S_{PH}(k)=0$ to the non-driven state $S_{PH}(k)=1$ can be alternatively detected in a voltage-based manner. To this end, provision is made that, after detection of the state transition of the supply terminal j of the motor controller from the non-driven state $S_{PH}(j)=1$ to the driven state $S_{PH}(j)=0$, the emulator power electronics are driven in such a manner that the other terminals k, l of the emulator power electronics are set to a predefined voltage $u_{intermediate}$ through an inductive decoupling. The transition of a supply terminal k of the motor controller from the driven state $S_{PH}(k)=0$ to the non-driven state $S_{PH}(k)=1$ is then detected based on voltage when, after decay of the current through the supply terminal k or through the load terminal k of the emulator power electronics, the voltage measured in return by the emulator controller at the supply terminal k is equal to the predefined voltage $u_{intermediate}$ over a predetermined second time period $t_2$. This voltage-based method for detecting the state transition of a supply terminal from the driven to the non-driven state is based on the fact that a non-driven supply terminal of the motor controller that is disconnected from the voltage supply of the motor controller with high resistance by opened semiconductor switches in the motor controller can be set to a predefined voltage—here the voltage $u_{intermediate}$—without difficulty. This is not possible for a supply terminal that continues to be driven, since the dominant influence on it would be the voltage source in the motor controller. Due to the inductive decoupling, a voltage predefined by the voltage source in the emulator power electronics would have no lasting effect on the voltage at the supply terminals of the motor controller.

It is important in the method to wait for the decay of the current through the supply terminal k or the load terminal of the emulator power electronics, since otherwise the voltage caused by the variable current in the decoupling inductance would be added to the voltage $u_{intermediate}$ predefined by the emulator power electronics.

It is useful and preferred to select the predefined voltage $u_{intermediate}$ in the range of the DC voltage switched by the motor controller, for example, equal to half the DC link voltage $v_{DC\_Link}$ of the motor controller. According to an embodiment of the method, the predetermined second time period $t_2$ is made long enough that a reliable distinction between a continuously driven supply terminal and a supply terminal that was previously driven but is then no longer driven is possible even with low load currents. In the application cases already mentioned, in which three-phase brushless DC motors driven in block commutation mode are used as auxiliary units in automotive applications, it has proven to be advantageous for $t_2$ to be chosen in the region of approximately 10 μs.

According to an embodiment of the method for emulating a three-phase brushless DC motor provision is made that not only is the first-described current-based method for detecting the transition of a supply terminal of the motor controller from the driven state to the non-driven state implemented in the emulator power electronics, but also the subsequently described voltage-based method for detecting such a transition. Preferably, the detection by the emulator controller of the transition of a supply terminal k of the motor controller from the driven state $S_{PH}(k)=0$ to the non-driven state $S_{PH}(k)=1$ is voltage-based as a general rule when the magnitudes of the calculated phase currents $i_{emulate}$ of the driven supply terminals k, l are below a current threshold $i_{TH}$ at the point in time when the state transition of the supply terminal j of the motor controller from the non-driven state $S_{PH}(j)=1$ to the driven state $S_{PH}(j)=0$ is detected. For the case in which the magnitudes of the calculated phase currents $i_{emulate}$ of the driven supply terminals k, l are above the current threshold $i_{TH}$, detection by the emulator controller of the transition of a supply terminal k of the motor controller from the driven state to the non-driven state is current-based, as has been described above.

An emulator controller is also provided for controlling emulator power electronics for emulating a three-phase brushless DC motor, wherein the supply terminals that are driven and the supply terminals that are not driven by a motor controller can be determined by the emulator controller, and the emulator power electronics can be driven by the emulator controller in such a way that phase currents $i_{emulate}$ calculated by the emulator controller on the basis of a motor model flow in the supply terminals that are driven by the motor controller, and a phase voltage $v_{emulate}$ calculated by the emulator controller on the basis of a motor model is applied to the supply terminal that is not driven by the motor controller. In this emulator controller, the solution is attained by the means that when the emulator controller is used as intended, the transition of a supply terminal j of the motor controller from the non-driven state $S_{PH}(j)=1$ to the driven state $S_{PH}(j)=0$ is detected when the magnitude of the difference voltage $v_{diff}(j)$ between the output voltage $v_{inv}(j)$ measured at the supply terminal j of the motor controller and the calculated phase voltage $v_{emulate}(j)$ is greater than a predetermined voltage threshold $v_{TH}$ for a predetermined first time period $t_1$, and that after detection of the state transition of the supply terminal j of the motor controller from the non-driven state $S_{PH}(j)=1$ to the driven state $S_{PH}(j)=0$, the emulator controller drives the emulator power electronics such that the phase current $i_{emulate}$ calculated by the emulator controller flows through the supply terminal j that is now driven by the motor controller. In preferred exemplary embodiments, moreover, the emulator controller is configured very specifically such that it executes the above-described method when it is used as intended, which is to say, for example, in that a programmable computing unit that is part of the emulator controller is programmed accordingly.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
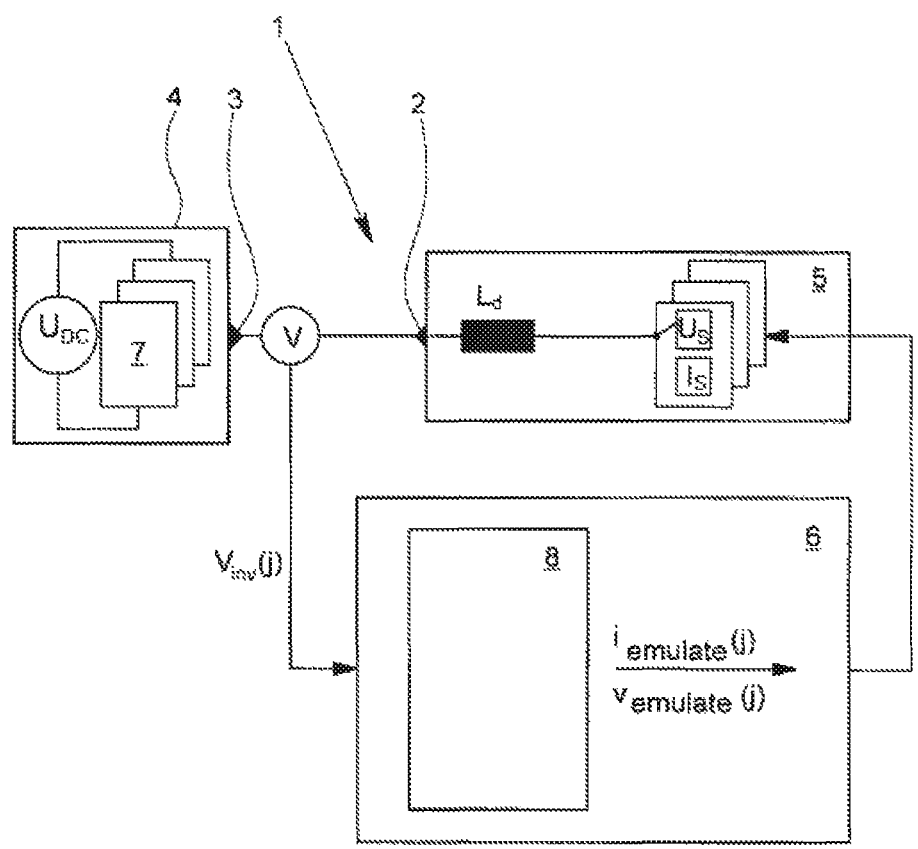
FIG. 1 is an arrangement composed of a motor controller and load emulator for carrying out the method according to the invention.

First of all, shown in FIG. 1 is an arrangement for carrying out a method for emulating a three-phase brushless DC motor using a load emulator 1, wherein the load emulator 1 is connected in a three-phase manner via its load terminals 2 to the supply terminals 3 of a motor controller 4. The load emulator 1 has emulator power electronics 5 and an emulator controller 6 for controlling the emulator power electronics 5. In the present case, the motor controller 4 also includes power electronics in the form of an inverter 7 indicated as three phases that is supplied with power through a DC voltage source $U_{DC}$ and that drives a three-phase AC load through its supply terminals 3 by appropriate switching of the semiconductor switches included in the inverter 7.

The method provides for the emulator controller 6 to determine the supply terminals 3 that are driven by the motor controller 4 and are not driven, wherein the emulator power electronics 5 are driven by the emulator controller 6 in such a manner that phase currents $i_{emulate}$ calculated by the emulator controller 6 on the basis of a motor model 8 flow in the supply terminals 3 that are driven by the motor controller 4, and a phase voltage $v_{emulate}$ calculated by the emulator controller 6 on the basis of the motor model 8 is applied to the supply terminal that is not driven by the motor controller 4. It can be seen that, in order to accomplish this task, the emulator power electronics 5 have current sources $I_s$ as well as voltage sources $U_s$ that can be switched appropriately onto the load terminals 2 of the emulator power electronics 5, wherein this takes place indirectly for each case through a decoupling inductance $L_d$ in the present case.

Figure 2:
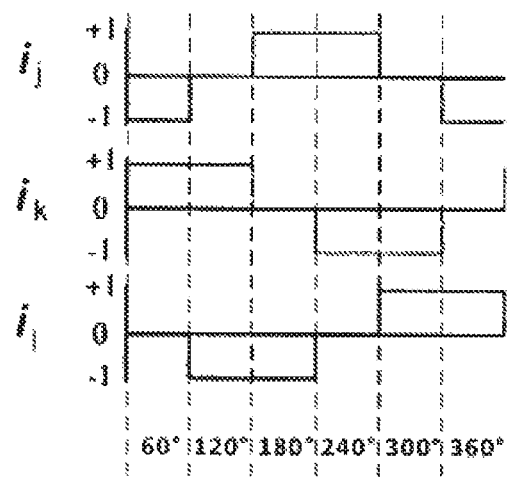
FIG. 2 illustrates the commutation transitions within one electrical rotation at the supply terminals of a motor controller.

FIG. 2 shows the six commutation transitions occurring within one electrical rotation in a three-phase brushless DC motor driven in block commutation mode, wherein the commutations each take place at an electrical angular spacing of 60°. It can be seen that the non-driven supply terminal is maintained in one phase only in one commutation interval and after that immediately switches back to the driven state; the phases are labeled here as $i_j$, $i_k$, and $i_l$. One of the two driven supply terminals 3 of the motor controller 4 switches to the non-driven state, while the other driven supply terminal remains in the driven state. By means of the block-commutated drive, an appropriate rotating field with which a corresponding torque can be applied is thus created in the brushless DC motor.

Figure 3:
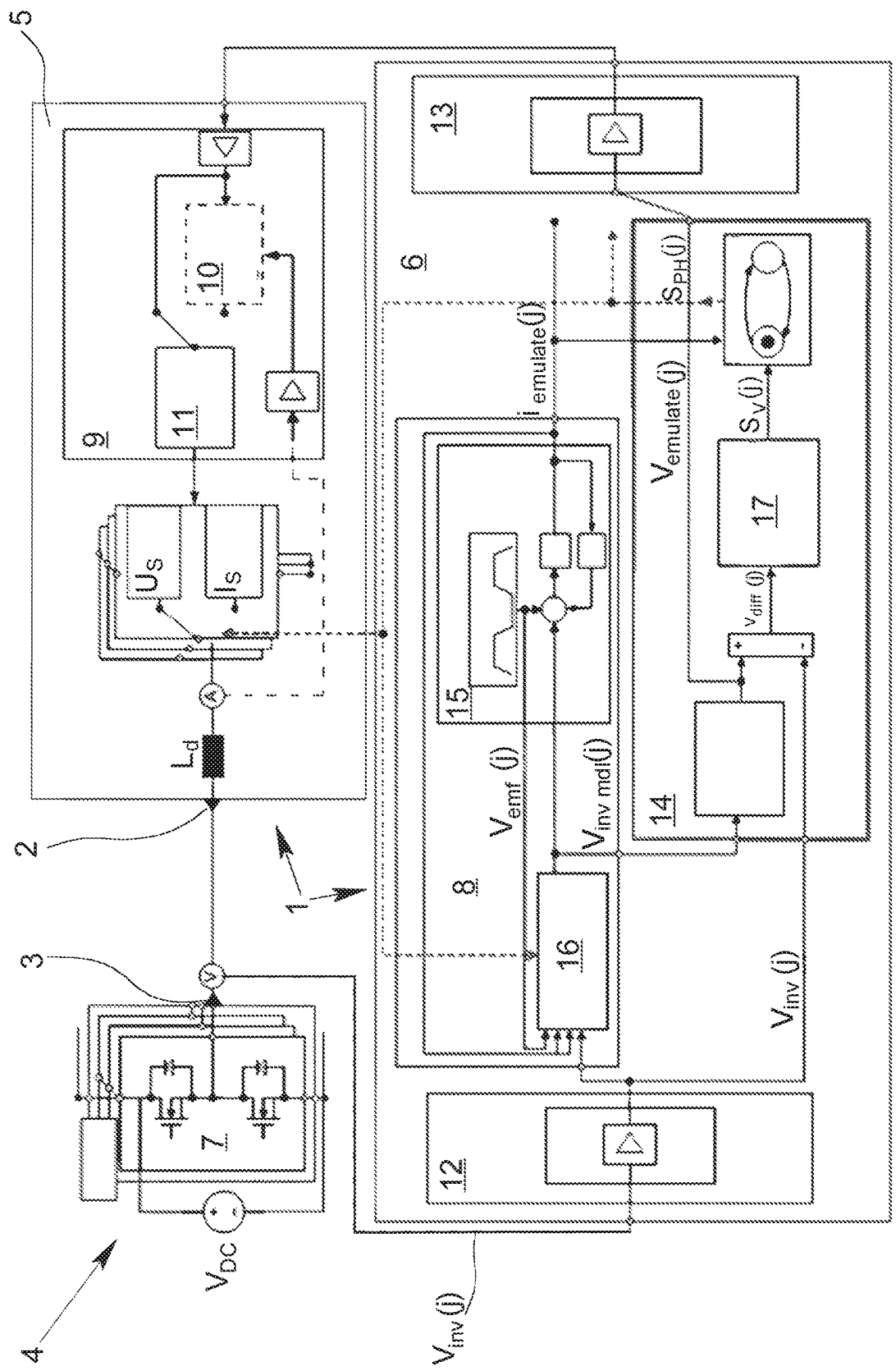
FIG. 3 is a detailed representation of the arrangement for carrying out the method according to the invention.

Shown in FIG. 3 once again, at a higher level of detail, is the arrangement from FIG. 1 for carrying out the method according to the invention with the emulator controller 6 configured according to the invention. Shown within the emulator power electronics 5 is a controller 9, which ensures that the predefined phase currents are actually set at the load terminals 2 as specified by the emulator controller 6. To this end, the phase current of interest in each case is measured in return within the emulator power electronics 5 and is supplied to a control algorithm 10 for the purpose of producing a control deviation. By means of a modulator 11, a predefined voltage value or a predefined current value is assigned to the correct phase in each case.

The emulator controller 6 in the exemplary embodiment shown is implemented on an FPGA board, on which "hard-wired" circuit structures ensure the ability to execute the method described below especially rapidly. The output voltages $v_{inv}(j)$, which are measured at the supply terminals 3 of the motor controller 4, are read into the emulator controller 6 through the input interface 12 and are made available there; these are therefore actual measured quantities. The calculated target specifications for calculated phase voltages $v_{emulate}(j)$ and for calculated phase currents $i_{emulate}(j)$ are output to the emulator power electronics 5 through the output interface 13.

Additionally implemented within the emulator controller 6 is a state machine 14 that is used to detect commutation-related state changes at the supply terminals 3 of the motor controller 4. The state of the supply terminal j is invariably referred to hereinbelow as $S_{PH}(j)$, where the value 1 stands for the non-driven state of the supply terminal j and the value 0 stands for the driven state of the supply terminal in question.

It is fundamental for commutation detection that the transition of a supply terminal j of the motor controller 4 from the non-driven state $S_{PH}(j)=1$ to the driven state $S_{PH}(j)=0$ is detected when the magnitude of the difference voltage $v_{diff}(i)$ between the output voltage $v_{inv}(j)$ measured at the supply terminal j of the motor controller 4 and the calculated phase voltage $v_{emulate}(j)$ is greater than a predetermined voltage threshold $v_{TH}$ for a predetermined first time period $t_1$.

Figure 4:
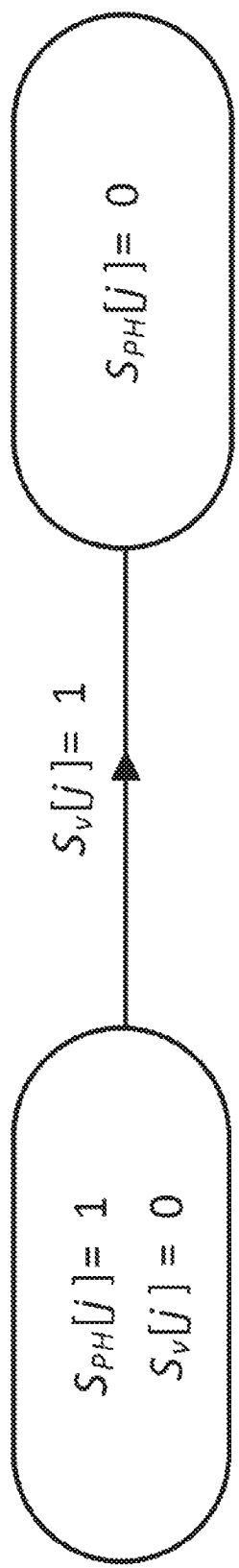
FIG. 4 is a state diagram to explain the detection of the transition of a supply terminal of the motor controller from the non-driven state to the driven state.

This state of affairs is also shown once again in FIG. 4 using a state diagram, where $S_v$ is the auxiliary state variable that indicates whether the magnitude of the difference voltage $v_{diff}(j)$ over a minimum time period $t_1$ was greater than or less than the predetermined voltage threshold $v_{TH}$, which is to say that:

$$S_v(j) := \begin{cases} 1, \text{min while time } t_1 : |v_{diff}(j)| \geq v_{TH} \\ 0, \text{min while time } t_2 : |v_{diff}(j)| < v_{TH} \end{cases}$$

The reason for focusing on the supply terminal j that initially is not driven is that this terminal experiences an unequivocal state transition at every commutation event, and hence is a definitive indicator of a commutation. A difference voltage $v_{diff}(j)$ is to be expected here in every case, since the measured output voltage $v_{inv}(j)$ changes upon a switching operation of the motor controller 4 to a boundary value of the motor controller voltage $U_{DC}$, while the calculated voltage $v_{emulate}(j)$ continues to remain at a predefined value within the DC interval of the motor controller because the calculation within the emulator controller 6 is based on a non-driven state of the supply terminal j in question.

After detecting the transition of the supply terminal j from the non-driven state to the driven state, the method implemented in the emulator controller 6 continues to provide for the emulator power electronics 5 to be driven by the emulator controller 6 in such a manner that the phase current $i_{emulate}(j)$ calculated by the emulator controller 6 flows through the supply terminal j that is now driven by the motor controller 4. The calculated phase current $i_{emulate}(j)$ is the result produced by the calculation of the motor model 8 in the current calculation 15.

The motor model 8 simulates the motor stator currents $i_{emulate}$ that are to be emulated on the basis of the measured output voltages $v_{inv}$ of the motor branches driven by the motor controller 4. The voltage of the currentless motor branch then results from the measured output voltages $v_{inv}$ of the motor branches or supply terminals 3 of the motor controller 4 that are driven and thus supplied with current and from the inductive and magnetic characteristics of the simulated brushless DC motor. The magnetic characteristics are described by the induced voltages $v_{emf}$ in the three motor phases. Thus, dependent on the state $S_{PH}$, the following measured phase voltages $v_{inv\_mdl}$ result as input voltages for the current simulation of the motor model 8, namely the measured voltages at the driven supply terminals 3, for which $S_{PH}(j)=0$ thus applies, and a simulated voltage for the non-driven phase or for the non-driven supply terminal of the motor controller 4. This is a calculated voltage here, which is then output by the emulator power electronics 5 and consequently can be measured at the non-driven supply terminal of the motor controller 4. The calculation of this voltage is based on the measured drive voltages of the phases that are driven and thus supplied with current, on the current-dependent electrical inductive motor characteristics, on the simulated motor currents, and on the simulation of the magnetic characteristics, namely the induced back EMFs $v_{emf}$ of the simulated motor. The magnetic characteristics of the brushless DC motor are described here by means of a look-up table as a function of the electrical motor angle. A feedback of the electrical and magnetic characteristics from the current simulation 15 is therefore necessary for simulation of the voltages measured at the motor controller 4 as part of an inverter calculation 16. These details of the calculation of the motor model 8 are not critical to understanding and executing the invention—the important thing is that the motor model provides a reliable calculation of the phase currents $i_{emulate}$.

The monitoring over time of whether the difference voltage $v_{diff}$ is greater or less than the predetermined voltage threshold $v_{TH}$ for a predetermined time $t_1$, expressed by the auxiliary state variable $S_v$ specified above, takes place in the voltage monitor 17 of the state machine 14.

Even though the motor model 8 and the calculation of the motor model 8 is not the main subject matter of the present invention, the way that a possible calculation could be carried out is nevertheless explained below; as already indicated, the specific details of the motor model 8 on which the calculation is based are not crucial, and the motor model 8 that is employed may vary with the demands for precision of the model and with the hardware that is available for calculating the model. Assuming symmetrical inductive characteristics in the three motor phases with a motor having star connection topology, the following simulated phase voltages result at the supply terminals 3 of the motor controller 4:

$$v_{inv\_mdl}(j) := \begin{cases} v_{inv}(j), \text{ if } S_{PH}(j) = 0 \text{ and } \Sigma_{i=1}^{3} S_{PH}(i) \neq 3 \\ \frac{\Sigma_{i=1}^{3}(1 - S_{PH}(i))(v_{inv}(i) - v_{emf}(i))}{3 - \Sigma_{i=1}^{3} S_{PH}(i)}, \text{ if } S_{PH}(j) = 1 \text{ and } \sum_{i=1}^{3} S_{PH}(i) \neq 3 \\ 0, \text{ if } \Sigma_{i=1}^{3} S_{PH}(i) = 3 \end{cases}$$

The phase voltage $v_{emulate}$ calculated by the emulator controller 6 on the basis of the motor model 8 corresponds substantially to the aforementioned simulated phase voltages of the motor controller 4, it is set to a certain value of the DC link voltage $v_{DC\_Link}$, for instance $v_{DC\_Link}/2$, when two phases or two supply terminals 3 of the motor controller 4 are not driven, wherein these are only transitional states, or all three phases or all three supply terminals 3 are driven.

Once the supply terminal j of the motor controller 4 that has transitioned from the non-driven state to the driven state has been successfully detected, the other two supply terminals 3 of the motor controller 4 must now be explicitly identified. Detection of the transition of a supply terminal 3 of the motor controller 4 from the driven state to the non-driven state can take place in a current-based or voltage-based manner, as was already explained in the general portion of the description.

Figure 5:
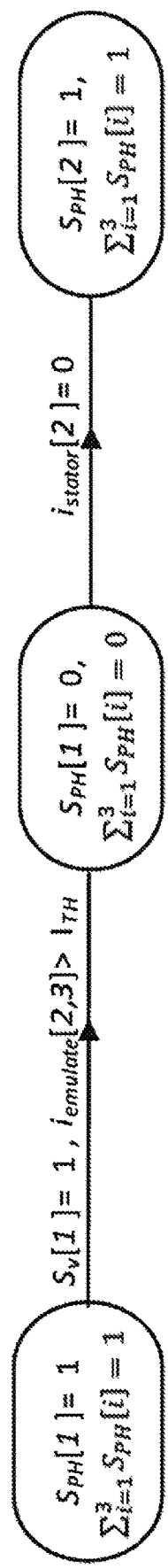
FIG. 5 is a state diagram to explain the current-based detection of the transition of a supply terminal of the motor controller from the driven state to the non-driven state.

The aforementioned state change is detected in the current-based case by the circumstance that the calculated phase current $i_{emulate}$ at the applicable load terminal 2 of the load emulator 1 is sensed as zero. This is represented in FIG. 5 by means of another state diagram, with the notable feature here being that the current-based detection of the state change is employed when the magnitudes of the calculated phase currents $i_{emulate}$ of the driven supply terminals k, l are above a current threshold $i_{TH}$ at the point in time when the state transition of the supply terminal j of the motor controller 4 from the non-driven state to the driven state is detected. The criterion of the current threshold $i_{TH}$ is intended to prevent a zero current that arises with low loads due to measuring inaccuracy, interference, or other factors from resulting in a misinterpretation of a supply terminal 3. The transition from the state shown at the far left in FIG. 5 to the center transition state initially does not affect the non-driven supply terminal (labeled here with the number 1) and the detection of the transition to the driven state. The transition from the center transition state to the state shown at the far right then affects the supply terminal labeled with the number 2 of the motor controller 4 or the corresponding load terminal 2 of the load emulator 5, through which the current is measured as zero. The result of these conditions is that the supply terminal labeled with the number 2 has now switched to the non-driven state ($S_{PH}(2)=1$).

Figure 6:
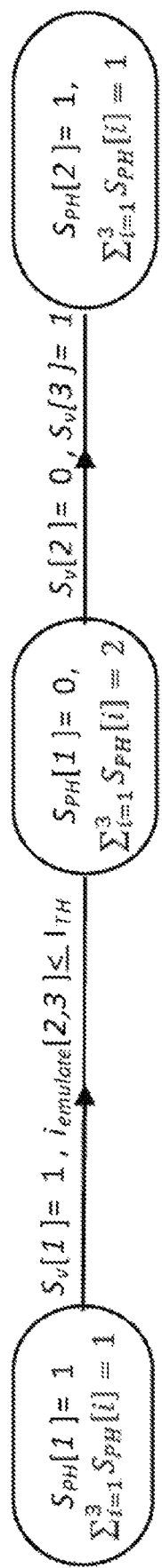
FIG. 6 is a state diagram to explain the voltage-based detection of the state transition of the supply terminal of the motor controller from the driven state to the non-driven state.

Shown alternatively in FIG. 6 is the voltage-based detection of the transition of a supply terminal k of the motor controller 4 from the driven state to the non-driven state. The transition from the state shown at the far left to the center transition state once again shows only the detection of the transition of the phase labeled with the number 1, or of the corresponding supply terminal of the motor controller 4, from the non-driven state ($S_{PH}(1)=1$) to the driven state ($S_{PH}(1)=0$). The additional condition that the calculated current in the phases labeled with the numbers 2 and 3 must be less than a current threshold $i_{TH}$ will be discussed further below. In the center state, the emulator controller 6 ensures that the emulator power electronics, and thus the connected motor controller, are shifted to a transitional state. It is ensured, namely, that the other terminals of the emulator power electronics, which are labeled in the formulas with the numbers 2 and 3, are set to a predefined voltage $u_{intermediate}$ through an inductive decoupling.

The transition of a supply terminal 3 of the motor controller 4 from the driven state to the non-driven state is detected based on voltage exactly when, after decay of the current through the applicable supply terminal 3 or the applicable load terminal 2 of the emulator power electronics 5, the voltage measured in return at the supply terminal 3 by the emulator controller 6 is equal to the predefined voltage $u_{intermediate}$ over a predetermined second time period $t_2$. In the example shown, fulfillment of the aforementioned condition ($S_v(2)=0$) is detected for the phase labeled with the number 2, so it is clear that the phase labeled with the number 2 has switched from the driven state to the non-driven state ($S_{ph}(2)=1$). In the present case, the phases labeled with the numbers 2 and 3 have each been set to half the DC link voltage $v_{DC\_Link}$ through the emulator power electronics 5.

Because the second phase, and thus the second supply terminal, is no longer driven by the motor controller 4 in the example shown here, the measured voltage $v_{inv}(2)$ at the second supply terminal of the motor controller 4 subsequently corresponds to the voltage to be emulated, once the current has decayed through the corresponding freewheel diode within the motor controller 4. If the voltage is maintained over the predetermined second time period $t_2$, the transition to the non-driven state has been correctly detected. The measured voltage $v_{inv}(3)$ of the still-driven third phase and of the still-driven third supply terminal of the motor controller 4, in contrast, will differ from the applied voltage $u_{intermediate}$, which here has been chosen as half the DC link voltage $v_{DC\_Link}$, since the voltage connection by the motor controller 4 at the third supply terminal prevails over the voltage predetermined by the emulator power electronics 5 on account of the inductive decoupling.

The criterion of transition from the left-hand state to the center state, namely $i_{emulate}(2, 3) \leq i_{TH}$, additionally shown in FIG. 6 is used in addition here in order to "unlock" the use of the voltage-based state detection. In a preferred variant, a decision between the use of the described voltage-based and current-based state detection is made, based on the criterion explained with regard to the driven phase currents, as to which of the two methods is used in the specific case. The current-based transition detection is only used with adequately large phase currents in order to avoid misinterpretation in the current-based detection.

Figure 7:
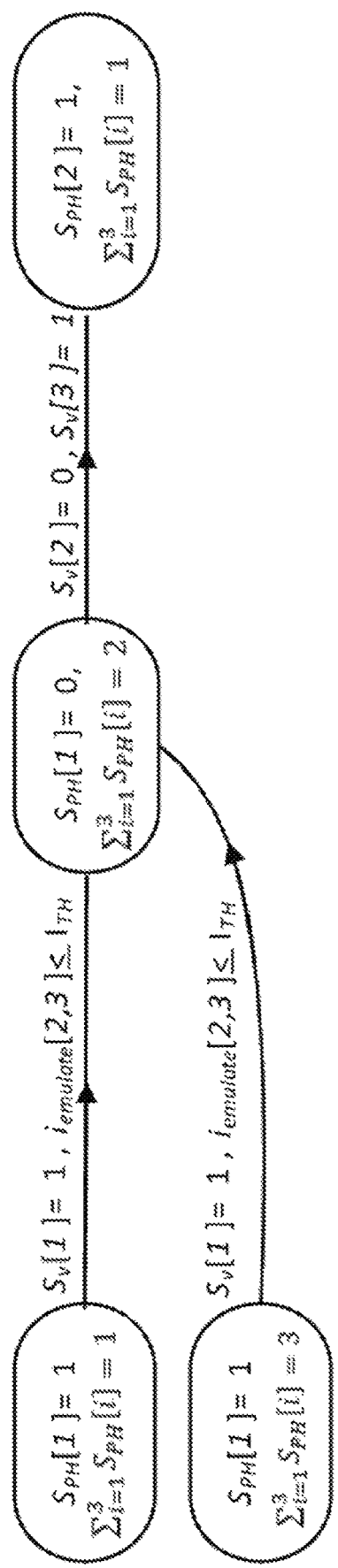
FIG. 7 is an extension of the state diagram from FIG. 6 for voltage-based detection of motor startup.

FIG. 7 shows another application possibility for voltage-based commutation detection. The top three states and transitions between these states are identical to the states and transitions in FIG. 6. What is new is the state shown at the bottom left, in which none of the three phases or none of the three supply terminals 3 of the motor controller 4 are driven. During motor startup, one of the three phases is detected as a driven phase—here again the phase labeled with the number 1 or the supply terminal labeled with the number 1 of the motor controller 4—through the auxiliary state variable $S_v$. The other two phases remain in the currentless state until they can be detected as currentless or driven in accordance with the applicable auxiliary states $S_v$.

Figure 8:
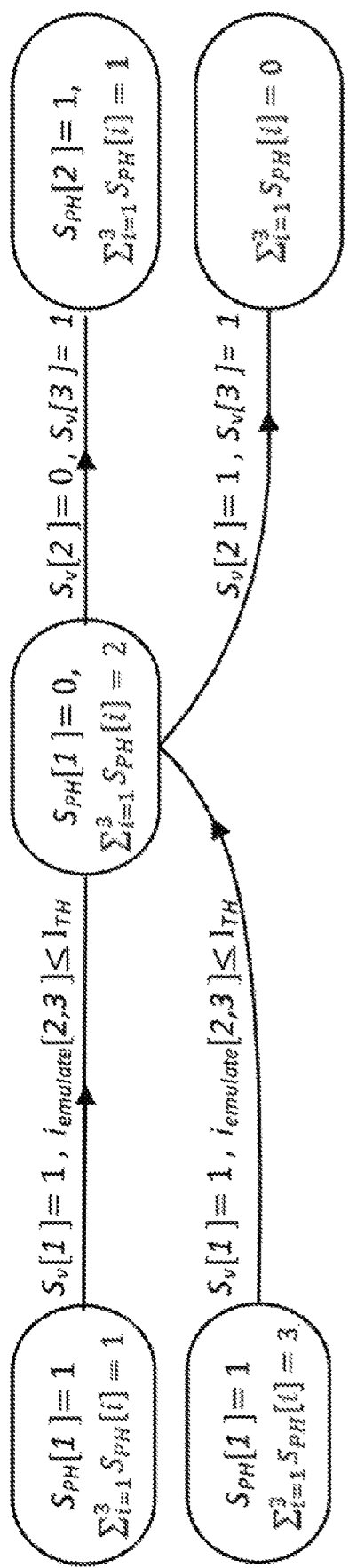
FIG. 8 is an extension of the state diagram from FIG. 7 for voltage-based detection of the state in which all supply terminals of the motor controller are driven.

During motor startup, it is often customary, especially in sensorless operation, for all three phases to be supplied with current or for all three supply terminals of the motor controller 4 to be driven as long as the brushless DC motor driven in block commutation mode has not yet reached a certain minimum speed. Even this special operating state can be detected in a voltage-based manner, which is shown in FIG. 8.

For the case when all supply terminals 3 are actively driven by the motor controller 4 and at the same time the corresponding load terminals 2 of the emulator power electronics 5 are driven with the auxiliary voltage $u_{intermediate}$, the voltage provided by the motor controller 4 prevails at the driven supply terminals 3 on account of the assumed inductive decoupling in the emulator power electronics 5 at the affected supply terminals 3 of the motor controller 4. As a result, the difference voltage $v_{diff}$ between the voltages $v_{inv}$ measured in return and the emulated voltages $v_{emulate}$ is non-zero and becomes ever larger. Hence, if a transition is also detected from the non-driven state to the driven state for the remaining supply terminals 3 of the motor controller 4, the motor controller 4 is in three-phase motor startup, which is to say in the state shown at the bottom right in FIG. 8.

Introduced as an additional condition for the transition from the intermediate state ($S_{PH}(1)=0$) to the state in which all three supply terminals of the motor controller 4 are driven is that all auxiliary state variables $S_v(i)$ correspond to the value 1 over a defined time, namely a third time period $t_3$. Preferably the third time period $t_3$ is chosen to be longer than the predetermined second time period $t_2$. Timing in order to determine the third time period $t_3$ starts with the transition into the state in which all auxiliary state variables $S_v$ have taken on the value 1. The predetermined third time period $t_3$ must be chosen to be longer than the predetermined second time period $t_2$, since otherwise the state change to the state $S_{PH}(2)=1$ shown in FIG. 8, in which the second phase is the only non-driven phase, could never occur, because the conditions $S_v(2)=1$ and $S_v(3)=1$ would always be fulfilled earlier than the conditions $S_v(2)=0$ and $S_v(3)=1$. In addition, the time value of $t_3$ should also be greater than the predetermined second time period $t_2$ by at least the latency period between a state change from a non-driven state to a driven state, or from a currentless state to a state supplied with current, and the imposition of the corresponding voltage to be emulated.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for emulating a three-phase brushless DC motor using a load emulator, the method comprising:
    connecting the load emulator in a three-phase manner via load terminals of the load emulator to supply terminals of a motor controller, the load emulator having emulator power electronics and an emulator controller for controlling the emulator power electronics;
    determining, via the emulator controller, the supply terminals that are driven by the motor controller and the supply terminals that are not driven, the emulator power electronics being driven by the emulator controller such that phase currents calculated by the emulator controller based on a motor model flow in the supply terminals that are driven by the motor controller;
    applying a phase voltage calculated by the emulator controller based on the motor model to one of the supply terminals that is not driven by the motor controller;
    detecting a state transition of said one of the supply terminals of the motor controller from a non-driven state to a driven state by determining when a magnitude of a subtractive difference voltage between an output voltage measured at said one of the supply terminals of the motor controller and the phase voltage of said one of the supply terminals calculated by the emulator collector is greater than a predetermined voltage threshold for a predetermined first time period; and
    driving, via the emulator controller after detection of the state transition of said one of the supply terminals of the motor controller from the non-driven state to the driven state, the emulator power electronics such that a phase current calculated by the emulator controller flows through said one of the supply terminals that is now driven by the motor controller.

2. The method according to claim 1, wherein the predetermined voltage threshold is larger than a maximum deviation between the calculated phase voltage in a phase of a non-driven supply terminal and an actual voltage measured in return at the non-driven supply terminal during a constant switching state of the motor controller and thus of the emulator power electronics, and
    wherein one fifth of a DC link voltage of the motor controller is chosen for the predetermined voltage threshold.

3. The method according to claim 1, wherein the predetermined first time period is longer than a duration of transient voltage distortions, said transient voltage distortions caused by incident electromagnetic radiation being a function of environment and structure, or wherein the predetermined first time period is longer than a latency of an imposition of voltage by the emulator controller and the emulator power electronics, and
    wherein the predetermined first time period is between 1 and 9 microseconds.

4. The method according to claim 1, wherein the state transition of said one of the supply terminals of the motor controller from the driven state to the non-driven state is detected based on a current when a calculated phase current through one of the load terminals of the load emulator and through a corresponding supply terminal is sensed to be zero.

5. The method according to claim 4, wherein a current-based detection of the state change by the motor controller of said one of the supply terminals from the driven state to the non-driven state is used if magnitudes of calculated phase currents of driven supply terminals are above a current threshold at a point in time when the state transition of said one of the supply terminals of the motor controller from the non-driven state to the driven state is detected.

6. The method according to claim 5, wherein the current threshold is specified as $$i_{TH} = \frac{u_{DC\_Link}}{2L_{PH}} \frac{T}{2}.$$

7. The method according to claim 1, wherein, after detection of the state transition of said one of the supply terminals of the motor controller from the non-driven state to the driven state, the emulator power electronics are driven such that other terminals of the emulator power electronics are set to a predefined voltage through an inductive decoupling, and
    wherein the state transition of said one of the supply terminals of the motor controller from the driven state to the non-driven state is then detected based on voltage when, after decay of a current through said one of the supply terminals or through one of the load terminals of the emulator power electronics, a voltage measured in return by the emulator controller at said one of the supply terminals is equal to the predefined voltage over a predetermined second time period.

8. The method according to claim 7, wherein the predefined voltage in a range of a DC voltage switched by the motor controller is equal to half of a DC link voltage of the motor controller.

9. The method according to claim 7, wherein the predetermined second time period is made long enough that a reliable distinction between a continuously driven supply terminal and a supply terminal that was previously driven but is then no longer driven is possible with low load currents, and
    wherein the predetermined second time period is 10 microseconds.

10. The method according to claim 7, wherein the emulator controller drives said one of the load terminals of the emulator power electronics that has been detected as not being driven by the motor controller such that the phase voltage calculated by the emulator controller on a basis of the motor model is applied.

11. The method according to claim 7, wherein a detection by the emulator controller of the state transition of said one of the supply terminals of the motor controller from the driven state to the non-driven state is voltage-based when magnitudes of calculated phase currents of driven supply terminals are below a current threshold at a point in time when the state transition of said one of the supply terminals of the motor controller from the non-driven state to the driven state is detected.

12. The method according to claim 1, wherein a motor startup is detected by the emulator controller in that all supply terminals of the motor controller are in the non-driven state at first and subsequently, after detection of the state transition of said at least one of the supply terminals of the motor controller from the non-driven state to the driven state, the emulator power electronics are driven such that other terminals of the emulator power electronics are set to a predefined voltage through an inductive decoupling.

13. The method according to claim 12, wherein a motor startup with three driven supply terminals of the motor controller is subsequently detected by the emulator controller in that a magnitude of difference voltages between all the output voltages measured at the supply terminals of the motor controller and all corresponding calculated phase voltages in each case for a predetermined third time period is greater than the predetermined voltage threshold.

14. The method according to claim 13, wherein the predetermined third time period is longer than the predetermined second time period, and wherein the predetermined third time period is greater than the predetermined second time period by at least a latency period between a state change from the non-driven state to the driven state and a voltage to be emulated for an imposition of the voltage by the emulator controller.

15. An emulator controller for controlling emulator power electronics for emulating a three-phase brushless DC motor, wherein supply terminals that are driven and the supply terminals that are not driven by a motor controller are determined by the emulator controller, wherein the emulator power electronics are driven by the emulator controller such that phase currents calculated by the emulator controller based on a motor model flow in the supply terminals that are driven by the motor controller, wherein a phase voltage calculated by the emulator controller based on the motor model is applied to one of the supply terminals that is not driven by the motor controller, wherein a state transition of said one of the supply terminals of the motor controller from a non-driven state to a driven state is detected by determining when a magnitude of a subtractive difference voltage between an output voltage measured at said one of the supply terminals of the motor controller and the calculated phase voltage of said one of the supply terminals is greater than a predetermined voltage threshold for a predetermined first time period, and wherein, after detection of the state transition of said one of the supply terminals of the motor controller from the non-driven state to the driven state, the emulator controller drives the emulator power electronics such that a phase current calculated by the emulator controller flows through said one of the supply terminals that is now driven by the motor controller.

16. An emulator controller, wherein the emulator controller is configured to execute the method according to claim 1.

17. The method according to claim 1, wherein the phase voltage is based on simulated magnetic characteristics of a simulated three-phase brushless DC motor.

18. The method according to claim 17, wherein the simulated magnetic characteristics comprise back EMFs of the simulated three-phase brushless DC motor.

19. The method according to claim 17, wherein the simulated magnetic characteristics of the simulated three-phase brushless DC motor are described in a look-up table as a function of the simulated three-phase brushless DC motor angle.

20. A method for emulating a three-phase brushless DC motor using a load emulator, the method comprising:

connecting load terminals of the load emulator to supply terminals of a motor controller, the load emulator having emulator power electronics and an emulator controller;

driving, by the emulator controller, the emulator power electronics to supply phase currents calculated based on a motor model to the supply terminals;

applying a phase voltage calculated by the emulator controller based on the motor model to one of the supply terminals;

detecting a state transition of said one of the supply terminals from a non-driven state to a driven state by determining when a magnitude of a subtractive difference voltage between an output voltage measured at said one of the supply terminals and the phase voltage of said one of the supply terminals calculated by the emulator controller is greater than a predetermined voltage threshold for a predetermined time period; and driving, by the emulator controller, the emulator power electronics to supply a phase current calculated by the emulator controller to said one of the supply terminals after detecting the state transition.

* * * * *